United States Patent [19]
Tsacoyeanes et al.

[11] 3,903,460
[45] Sept. 2, 1975

[54] CAPACITOR WITH LIQUID DIELECTRICS

[76] Inventors: Charles W. Tsacoyeanes, 19 Kimball Rd., Dedham, Mass. 02026; Richard Payne, 15 Thoreau Way, Sudbury, Mass. 01776; Morton A. Levine, 2701 Ridge Rd., Berkeley, Calif. 94709

[22] Filed: Jan. 7, 1974

[21] Appl. No.: 431,196

[52] U.S. Cl. .................. 317/258; 252/63.7; 252/64
[51] Int. Cl.² .......................................... H01G 5/20
[58] Field of Search ............... 317/249 R, 258, 242; 252/63.7, 64

[56] References Cited
UNITED STATES PATENTS
464,667   12/1891   Tesla .................................. 317/242

OTHER PUBLICATIONS
Birks, J. B., Modern Dielectric Materials, Heywood Co., London 1961 pp. 11 & 12.

Table of Dielectric Constanstants USDC NBS Circ. 514 8/51, pp. 7, 11, 15.

*Primary Examiner*—E. A. Goldberg
*Attorney, Agent, or Firm*—William J. O'Brien; Joseph E. Rusz

[57] ABSTRACT

A capacitor system which uses a wide range of liquid organic solvents as its dielectric medium. Illustrative examples of the dielectric materials contemplated by this invention are listed as follows: 4-butyrolactone, 4-valerolactone, dimethyl sulfoxide, N-methylpropionamide, propylene carbonate, acetonitride, N-n-butylacetamide and a mixture of ethylene carbonate and propylene carbonate.

7 Claims, 1 Drawing Figure

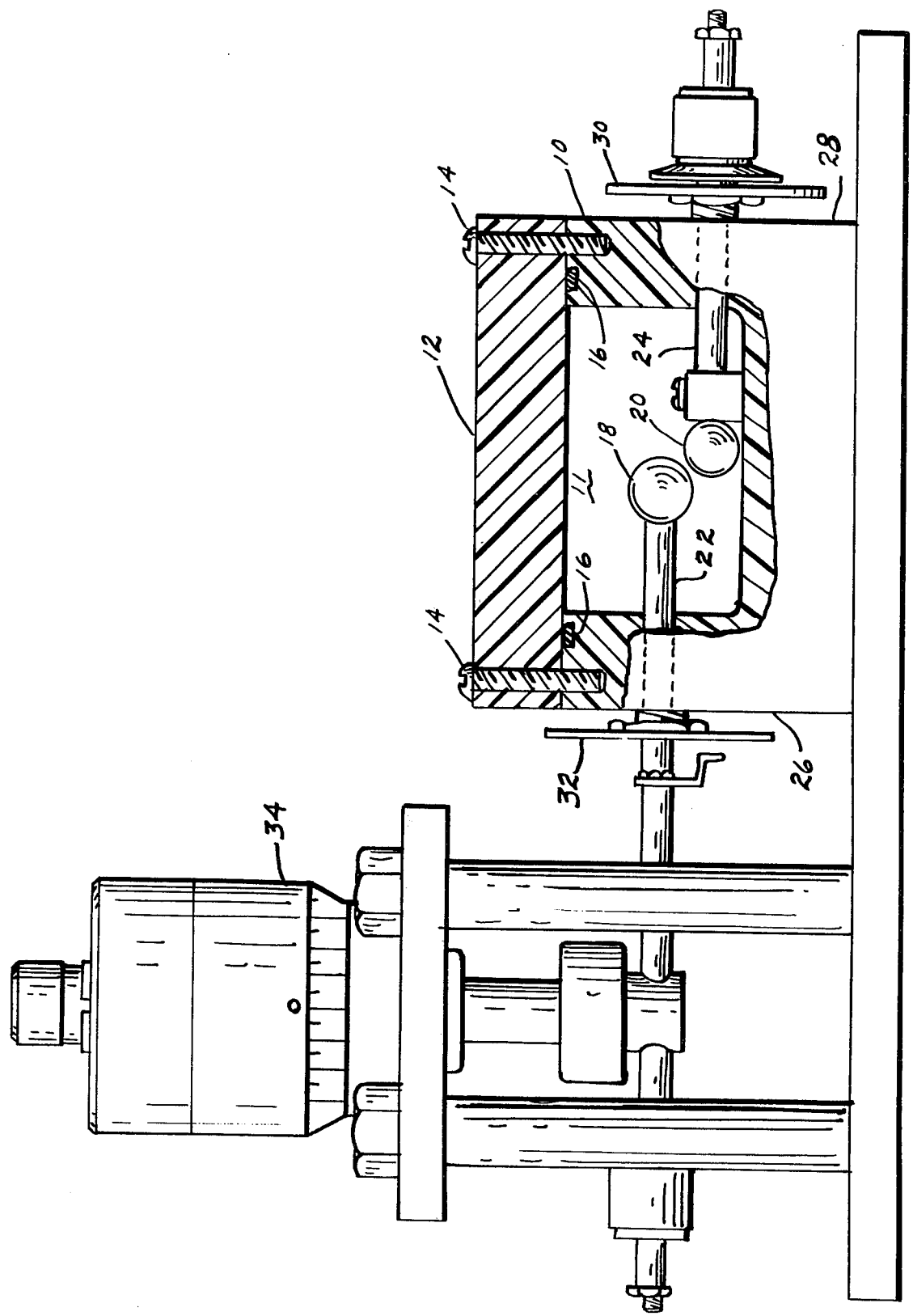

CAPACITOR WITH LIQUID DIELECTRICS

STATEMENT OF GOVERNMENT INTEREST

The invention described herein may be manufactured and used by or for the Government for governmental purposes without the payment of any royalty thereon.

BACKGROUND OF THE INVENTION

This invention relates to dielectric materials. In a more particular aspect, this invention concerns itself with a range of organic liquids that are particularly useful as liquid dielectric materials for high energy density, high discharge rate capacitors. A capacitor is a device for introducing capacitance into a circuit. In general, a capacitor consists of two conductors, usually metal plate which are insulated from each other by a dielectric. The capacitance of a capacitor depends primarily upon the shape and size of the capacitor and upon the relative dielectric constant of the medium between the plates. The dielectric medium may be a gas (or vacuum), a liquid, a solid, or a combination of these. Dielectrics are materials which are electrical insulators or in which an electric field can be sustained with a minimum dissipation of power. They are employed as insulation for wires, cables and electric equipment, as polarizable media for capacitors in devices used for the propagation or reflection of electromagnetic waves, and for a variety of dielectric devices, such as rectifiers and semiconductor devices, piezoelectric transducers, dielectric amplifiers, and memory elements.

The generation of high energy electrical pulses by discharge of a capacitor is limited by various properties of the dielectric medium used i.e., the dielectric constant, dielectric breakdown strength and electrical conductance. The dielectric constant controls the capacitance for a given electrode configuration while the breakdown strength sets the minimum electrode separation for given operating voltage. These two factors therefore control the volume energy density of the device. The residual electrical conductance of the dielectric medium results in self-discharge of the capacitor and therefore determines the time available for extracting the stored energy after charging. A fourth parameter which is relevant to rapid discharge of the capacitor is the dielectric loss of the medium which for simple dipolar liquids is characterized within the time range of interest by a single dipole relaxation time or distribution of relaxation times. The relaxation times for liquid dielectrics are generally in the picosecond or nanosecond time region.

A considerable effort has been applied in recent years to the development of high energy capacitors using water as the dielectric. The principal attraction of water is its high dielectric constant (78.3) which compares with values of only 2–3 for the transformer oils conventionally used in capacitors. Furthermore, the dipole relaxation time for water is in the picosecond time region and therefore has little effect on the discharge characteristics. The breakdown properties of water although inferior to that of transformer oils and some other low dielectric constant liquids are nevertheless sufficiently good to enable a substantial improvement in energy density to be achieved. The main drawback of water is its relatively high electrical conductance and especially a well-known tendency for the conductance to increase rapidly with time due to corrosion reactions and dissolution of electrolytic impurities from electrodes and container walls. The practical utilization of water therefore involves ancillary equipment for continuous de-ionization of the water by circulation over an ion-exchange bed. This results in a cumbersome arrangement which to some extent vitiates the advantages of the water dielectric. Attempts have been made to circumvent this problem by using other high dielectric constant liquids such as ethanol (dielectric constant 24.3) methanol (32.6), ethylene glycol (37.7) and glycerol (42.5). However, none of them can match the energy storage capability of water, and with the exception of glycerol (and possibly glycol) the conductance is unacceptably high. Furthermore, the conductance of ethanol and methanol tends to increase with time. Consequently, some form of continuous deionization would be required for these liquids as in the case of water. The low conductance of glycerol is related to high viscosity and relatively long relaxation time (1.6 $\mu$) which would be a problem in high discharge rate applications. At the present time, therefore, no suitable replacement for s) has been discovered.

In attempting to overcome this problem, it has been found, in accordance with this invention, that a range of high dielectric constant liquids possess characteristics that make them useful as capacitor dielectrics. They show a substantial improvement in energy storage capability, and also possess other important advantages over water. The liquid dielectrics of this invention are organic solvents with dielectric constants ranging from 30–200. They are well-known to organic chemists and have recently found important applications in electrochemistry. However, there is no known or recorded use of these liquids as capacitor dielectrics. This invention represents the only known teaching of high dielectric constant organic solvents with energy densities greater than water for use in a capacitor application. Previously, the largest energy densities achieved were in water capacitors. With the use of the dielectrics of this invention, a practical device will not require the cumbersome circulation systems for continuous deionization which is essential when water is used as the dielectric. The use of the organic liquid dielectric materials of this invention enables practical energy densities to be increased by a factor of 3 or more over currently available devices which use a water dielectric and the organic liquids have a much more stable conductance.

SUMMARY OF THE INVENTION

The present invention concerns itself with the use of a range of organic liquids as dielectric mediums for use in high energy, high speed capacitor applications. The requirements for such dielectrics are: (1) high dielectric constant; (2) high breakdown strength; (3) fast relaxation time and (4) low intrinsic conductance. It has been found that these essential characteristics are met by a wide range of organic solvents including: cyclic carbonates, sulfites and lactones, aliphatic and aromatic amides and N-substituted amides, nitriles, sulfoxides and sulfanes, glycols and polyhydric alcohols, nitroalkanes and organic compounds in general where the molecule possesses a large permanent dipole. Mixtures of these liquids are also suitable for use as capacitor dielectrics.

The following representative liquids have been found to be especially effective as a capacitor dielectric: propylene carbonate, N-methylpropionamide, dimethyl sulfoxide, 4-butyrolactone, 4-valerolactone, N-m-butylacetamide, acetonitrile and a mixture of propylene carbonate and ethylene carbonate.

Accordingly, the primary object of this invention is to provide liquid dielectric mediums for use in high energy density, high speed capacitor applications.

Another object of this invention is to provide organic liquid capacitor dielectrics that are characterized by properties which permit their use in high voltage capacitors.

Still another object of this invention is to provide an organic liquid dielectric medium for a capacitor that can produce a higher energy density than a capacitor which employs water as its dielectric medium.

The above and still other objects and advantages of the present invention will become more readily apparent upon consideration of the following detailed disclosure thereof when taken in conjunction with the accompanying drawing.

BRIEF DESCRIPTION OF THE DRAWING

In the drawing:

The FIGURE represents a side view, partially in section, of a capacitor test cell for obtaining dielectric and conductance test data on the liquid dielectrics of this invention.

DESCRIPTION OF THE PREFERRED EMBODIMENTS

With the above-mentioned objects in view, this invention is predicated upon the unexpected discovery that a wide range of liquid organic solvents possess the necessary characteristics that permit their use as a dielectric medium for high energy density, high speed capacitor applications. The requirements for such dielectrics are a high dielectric constant, a high breakdown strength, short relaxation time and low intrinsic conductance.

In order to amplify the necessary characteristics referred to above, it should be pointed out that the dielectric should preferably be a normal polar liquid. That is to say the high dielectric constant should result from a large permanent dipole moment rather than intermolecular association which can also (as in the case of water) result in an enhanced dielectric constant. Strong association generally results in other undesirable effects for example slow dielectric relaxation (water is a notable exception to this rule). However, there is a tradeoff between energy density and discharge rate capability which may make the use of associated liquids with exceptionally high dielectric constants, for example N methylpropionamide, attractive.

The intrinsic breakdown of dielectrics is poorly understood. However, breakdown strength is known to be strongly dependent on the presence of both dissolved and particulate impurities. Careful attention to purification is therefore essential. Organic liquids can be purified by a variety of standard teachniques including treatment with molecular sieves to remove water, chemical pretreatment for other impurities, fractional distillation or fractional crystallization. The technique selected for a specific liquid will be dependent on the properties of the liquid. The maximum energy storage capability of the capacitor depends on the square of the breakdown field which is therefore the most important design parameter.

The short relaxation time requirement is adequately met by most normal polar liquids. The relaxation time is roughly proportional to the molecular weight which therefore should be as low as possible. It is strongly dependent on intermolecular association which characterizes many liquids with labile hydrogen atoms (notably the aliphatic amides) and is therefore undesirable. However, association also generally results in a very high dielectric constant which as noted above may be an important tradeoff for some applications.

Residual conductance of the liquid determines the self-discharge time of the device and low conductance therefore is a critical parameter. Ordinary purification usually lowers the conductance to an adequately low level. Further improvements are possible through ion-exchange techniques. A serious disadvantage of water is its tendency to corrode and dissolve any materials in contact with it resulting in a rapid increase in the conductance. For this reason, continuous circulation of the dielectric through an ion-exchange column is essential for satisfactory operation of a water capacitor. This problem is avoided by the use of the organic liquids of this invention which generally have a lower and much more stable conductance.

The essential characteristics referred to above are met by a wide range of organic solvents including: cyclic carbonates, sulfites and lactones, aliphatic and aromatic amides and N-substituted anides, nitriles, sulfoxides and sulfones, glycols and polyhydric alcohols, nitroalkanes and organic compounds in general where the molecule possesses a large permanent dipole. Mixtures of these liquids are also suitable.

Specific representative examples of the dielectric materials contemplated by this invention, together with their test designation, are shown in Table I.

TABLE I

| Liquid Dielectric | Test Designation |
|---|---|
| 4-butyrolactone | BL |
| 4-valerolactone | VL |
| dimethyl sulfoxide | DMSO |
| N-methylpropionamide | NMP |
| propylene carbonate | PC |
| acetonitrile | AN |
| N-n-butylacetamide | NBA |
| ethylene carbonate/propylene carbonate mixture | EC-PC |

Dielectric and conductance data for the liquid organic solvents of this invention are generally available in the literature. Additional test results, however, were determined in accordance with this invention. For example, no recorded measurements of breakdown strength exist and all the data given herein have been determined by utilizing the test cell capacitor disclosed in the drawing.

The test cell comprises an insulating Teflon container 10 having a volume of approximately 100 ml. A cover 12, also of Teflon, is affixed by means of screws 14 to the container 10 to form an enclosure for the liquid dielectric test fluid 11. The cover 12 is affixed in sealed relationship to the body 10 by means of an O-ring 16. Two highly polished stainless steel ball bearing electrodes 18 and 20 are positioned within the container 10 and held in place by holding rods 22 and 24. The rods 22 and 24 extend through the side walls 26 and 28 of container 10 and in turn are connected to a pair of calibrated disks 30 and 32 utilized to adjust the positions of the electrodes with respect to one another. A micrometer arrangement 34 is affixed to the dial 32 and is employed to accurately determine the respective distance between the opposing electrodes 18 and 20. The breakdown measurements were made using the highly polished stainless steel ball bearing electrodes 18 and 20 and the separation of the electrodes is adjusted accurately by means of the micrometer 34. The separation was measured with a resolution of 5 microns using a traveling microscope and was checked by independent measurements of the inter-electrode capacitance using a radio frequency bridge technique at a frequency of 1MHz. The voltage applied to the electrodes, by a voltage source not shown, was a 20 microsecond pulse the height of which was increased in steps until breakdown was observed. The applied pulse was recorded oscilloscopically by conventional means. The electrodes were rotated to display a fresh surface after each breakdown.

charge time constant. At 25°C the highest energy density is observed for the propylene carbonate-ethylene carbonate mixture (28.0 × 10⁵ joules/m³) with a discharge time constant of 79 microseconds. For propylene carbonate at 25°C the corresponding figures are 18.9 × 10⁵ joules/m³ and 575 microseconds whereas at −78°C the performance of propylene carbonate improves to 43.4 × 10⁵ joules/m³ with a time constant of 39 milliseconds. The comparable figures for water, the best dielectric fluid previously available, are 6 × 10⁵ joules/m³ and 70 microseconds with continuous deionization. The performance of propylene carbonate at 25°C therefore represents an improvement over water by a factor of ~3 in energy density and ~8 in storage time; at −78°C the improvement factors are 7 and 550

TABLE II

DIELECTRIC BREAKDOWN MEASUREMENTS

| | BL $E_B$ (MV/CM) | DMSO $E_B$ | NMP $E_B$ | VL $E_B$ | EC-PC $E_B$ | PC $E_B$ | (−78°C) PC $E_B$ | AN $E_B$ | NBA $E_B$ |
|---|---|---|---|---|---|---|---|---|---|
| 1. | 0.64 | 0.94 | .49 | .94 | .78 | .90 | 1.06 | .36 | 18 |
| 2. | .57 | .40 | .44 | .74 | .77 | .55 | 1.05 | .34 | .49 |
| 3. | 1.04 | .45 | .41 | .71 | .68 | .84 | .96 | .37 | .62 |
| 4. | .59 | .28 | .46 | .79 | .98 | .89 | 1.05 | .35 | .25 |
| 5. | .67 | .27 | .68 | 1.12 | .90 | 1.01 | 1.15 | .26 | .32 |
| 6. | .62 | .68 | .37 | .60 | 1.14 | .73 | 1.13 | .18 | .68 |
| 7 | .97 | .90 | .55 | .83 | .60 | .92 | 1.12 | .24 | .46 |
| 8. | .49 | .28 | .49 | .72 | .94 | .65 | .82 | .19 | .24 |
| 9. | 1.00 | 1.15 | .36 | .81 | .77 | .73 | 1.15 | .24 | .46 |
| | .62 | .40 | .49 | .72 | .81 | .93 | 1.04 | .23 | .27 |
| 11. | .88 | .40 | .22 | .84 | .78 | .96 | .98 | .25 | .30 |
| 12. | .61 | .40 | .48 | .58 | .89 | .67 | 1.07 | .24 | .51 |
| Average | 0.73 | 0.55 | 0.45 | 0.78 | 0.84 | 0.82 | 1.05 | 0.27 | 0.40 |
| Standard Deviation | 0.21 | 0.30 | 0.11 | 0.15 | 0.14 | .14 | 0.09 | 0.07 | 0.16 |

$E_B$: Breakdown field in megavolts per centimeter

TABLE III

Comparison of Dielectric Properties and Energy Storage Capability for Various Liquid Dielectrics at 25°C

| | $\epsilon_r$ | (Avg.) $E_B$ (MV/cm) | W (joules/m³) | $\sigma$ ($\Omega^{-1}$ cm$^{-1}$) | $\tau_s$ (microseconds) | $\tau_D$ (picoseconds) |
|---|---|---|---|---|---|---|
| 1 BL | 42.7 | 0.72 | 9.8 × 10⁵ | 1.5 × 10⁻⁸ | 252 | 21 (0.8°C) |
| 2 DMSO | 46.7 | .55 | 6.2 × 10⁵ | 2 × 10⁻⁸ | 207 | 17 |
| 3 NMP | 172.2 | .45 | 15.4 × 10⁵ | 1 × 10⁻⁷ | 152 | 127 (28.2°C) |
| 4 VL | 35.6 | .78 | 9.6 × 10⁵ | 1 × 10⁻⁸ | 315 | 38 (0.8°C) |
| 5 EC-PC | 89.6 | .84 | 28.0 × 10⁵ | 1 × 10⁻⁷ | 79 | — |
| 6 PC | 65.0 | .81 | 18.9 × 10⁵ | 1 × 10⁻⁸ | 575 | 43 |
| 7 PC (−78°C) | 89.0 | 1.05 | 43.4 × 10⁵ | 1 × 10⁻¹⁰ | 39000 | 1300 |
| 8 AN | 36.7 | .27 | 1.2 × 10⁵ | 5 × 10⁻⁸ | 65 | 3.8 |
| 9 NBA | 101.7 | .40 | 7.2 × 10⁵ | 1.3 × 10⁻⁷ | 69 | — |

$\epsilon_r$: Dielectric constant
$E_B$: Breakdown field in megavolts per centimeter
W: (Energy stored per unit volume) = $\frac{1}{2} \epsilon_r \epsilon_o E_B^2$ (joules/meter³)
$\sigma$: Conductance in reciprocal ohm-centimeters $\tau_s = RC = \frac{\epsilon_r \epsilon_o}{\sigma}$ Self discharge time in microseconds $\tau_D$: Dipole relaxation time in picoseconds
$\epsilon_o$: Permittivity of free space All measurements of conductance, dielectric constant and dielectric relaxation (loss) were made by conventional methods.

Additional measurements were made for propylene carbonate at −78°C and for a mixture containing 17.7 weight percent ethylene carbonate. The results of these measurements are summarized in Table II. A comparison of dielectric properties and energy density for the various liquids tested is given in Table III. The most significant parameters in Table III are W, the stored energy per unit volume at breakdown, and $\tau_s$, the self-discharge time constant.

respectively. Most of the other liquids in Table I equal or exceed the performance of water and need no continuous deionization.

While the present invention has described with reference to particular embodiments thereof, it is to be understood that various alterations and modifications of the invention may be made without departing from the spirit of the invention, the scope of which is defined by the appended claims:

What is claimed is:

1. A high energy density and high discharge rate capacitor system comprising a pair of conductors positioned in opposed relationship to one another with a dielectric medium interdisposed therebetween, said dielectric medium being a liquid organic solvent selected from the group consisting of 4-valerolactone, dimethyl sulfoxide, N-methylpropionamide, propylene carbonate, N-n-butylacetamide and a mixture of ethylene carbonate and propylene carbonate.

2. A capacitor system in accordance with claim 1 wherein said dielectric medium is 4-butyrolactone.

3. A capacitor system in accordance with claim 1 wherein said dielectric medium is dimethyl sulfoxide.

4. A capacitor system in accordance with claim 1 wherein said dielectric medium is N-methylpropionamide.

5. A capacitor system in accordance with claim 1 wherein said dielectric medium is propylene carbonate.

6. A capacitor system in accordance with claim 1 wherein said dielectric medium is N-n-butylacetamide.

7. A capacitor system in accordance with claim 1 wherein said dielectric medium is a mixture of ethylene carbonate and propylene carbonate.

* * * * *